(12) United States Patent
Park (10) Patent No.: US 9,426,105 B2
(45) Date of Patent: Aug. 23, 2016

(54) INTERFACE FOR MANAGING MESSAGES IN A MOBILE TERMINAL

(71) Applicant: Samsung Electronics Co., Ltd., Gyeonggi-do (KR)

(72) Inventor: Chan-Ho Park, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 444 days.

(21) Appl. No.: 13/918,035

(22) Filed: Jun. 14, 2013

(65) Prior Publication Data

US 2013/0297712 A1 Nov. 7, 2013

Related U.S. Application Data

(63) Continuation of application No. PCT/KR2011/009675, filed on Dec. 15, 2011.

(30) Foreign Application Priority Data

Dec. 15, 2010 (KR) ........................ 10-2010-0128107

(51) Int. Cl.
*G06F 15/16* (2006.01)
*H04L 12/58* (2006.01)

(52) U.S. Cl.
CPC .............. *H04L 51/04* (2013.01); *H04L 12/588* (2013.01); *H04L 51/32* (2013.01); *H04L 12/5895* (2013.01)

(58) Field of Classification Search
CPC ............................ H04L 12/586; G06Q 10/107
USPC ........ 715/751, 752; 455/412.2; 709/203, 204, 709/206, 217, 219, 223, 224, 226, 228
See application file for complete search history.

(56) References Cited

U.S. PATENT DOCUMENTS

| | | | |
|---|---|---|---|
| 8,739,071 B2* | 5/2014 | Klassen | G06Q 10/107 715/752 |
| 2002/0152220 A1 | 10/2002 | Kang et al. | |
| 2003/0028604 A1 | 2/2003 | Aktas et al. | |
| 2004/0137955 A1 | 7/2004 | Engstrom et al. | |
| 2005/0193345 A1* | 9/2005 | Klassen | G06Q 10/107 715/751 |
| 2008/0113679 A1 | 5/2008 | Sung et al. | |
| 2010/0087173 A1* | 4/2010 | Lin | H04L 12/586 455/412.2 |

FOREIGN PATENT DOCUMENTS

| | | |
|---|---|---|
| CN | 101072197 A | 11/2007 |
| CN | 101557358 A | 10/2009 |
| CN | 101627642 A | 1/2010 |
| EP | 2 028 807 A1 | 2/2009 |
| KR | 10-2008-0043264 A | 5/2008 |
| KR | 10-2008-0043266 A | 5/2008 |
| WO | 2010/065752 A2 | 6/2010 |

* cited by examiner

*Primary Examiner* — Quang N Nguyen
(74) *Attorney, Agent, or Firm* — Cha & Reiter, LLC (57) ABSTRACT

An interface method for a mobile terminal includes: receiving in the order of time and saving two or more types of messages corresponding to two or more types of first applications; integrating and configuring the two or more types of messages using a second application, which integrates and manages the two or more types of first applications; and displaying the two or more types of messages with the identification information on the type of each of the messages using the second application.

14 Claims, 6 Drawing Sheets

| | A | B | C | D | E | |
|---|---|---|---|---|---|---|
| | 2010.11.08 AM11:59 | 2010.11.08 AM11:54 | 2010.11.08 AM11:39 | 2010.11.08 AM11:28 | 2010.11.08 AM11:24 | |
| | 2010.11.08 AM11:43 | 2010.11.08 AM11:47 | 2010.11.08 AM11:34 | 2010.11.08 AM11:12 | 2010.11.08 AM11:02 | |
| | 2010.11.08 AM11:08 | 2010.11.08 AM11:16 | ... | ... | ... | |
| | 10 | 20 | 30 | 40 | 50 | |
| | 11, 12, 13 | | | | | |

INTERFACE FOR MANAGING MESSAGES IN A MOBILE TERMINAL

CLAIM OF PRIORITY

The present application is a Continuation of PCT/KR 2011-009675 filed on Dec. 15, 2011 which in turn claims a priority to an earlier Korean patent application No. 10-2010-0128107 filed on Dec. 15, 2010, the content of which is incorporated by reference.

TECHNICAL FIELD

The present invention relates generally to an interface method for a portable terminal, and more particularly, to an interface method for providing a message management which allows a user to integrally receive various types of messages and transmits messages regardless of a type of the messages in the portable terminal.

BACKGROUND ART

In general, portable devices such as a cellular phone, a smart phone, a PDA, a laptop computer, and a tablet PC are being rapidly proliferated. A wireless communication module capable of accessing a mobile communication network is mounted in these devices, whereby users can perform data communication through the mobile communication network at anytime and anywhere. Further, users can use an SMS service of the mobile communication network, or a data service through a traffic channel of the mobile communication network, for example, a transmission/reception service of an e-mail.

However, the SMS service of the mobile communication network and the e-mail service of the data communication use protocols that are different from each other. For example, the SMS service uses a protocol prescribed in the mobile communication network, and the e-mail service uses a Post Office Protocol (POP)/Simple Mail Transfer Protocol (SMTP) supported by a server.

Accordingly, since the services are performed through the separate protocols, an application (an application program) for managing (making, displaying, and transmitting) a message through the SMS service (hereinafter, referred to as 'a SMS message'), and an application for managing a message through the e-mail service separately exist in the portable terminal accessing a 3G network or an internet network, whereby there is no choice but to manage the messages through separate DBs.

However, users are inconvenienced due to the fact that the SMS messages, the e-mail messages, and the messages provided through various SNS services are independent of each other as described above, thus find it difficult to manage the messages because a scheme for transferring only the contents require two separate means.

SUMMARY

Accordingly, the present invention has been made in view of the above-mentioned problems and provides additional advantages, by providing an interface method for providing a message management of a portable terminal, in which different types of messages are integrated to be displayed by a single interface through one application, and the messages are transmitted using the corresponding type of protocol according to the contents of a field which determines a type of the messages.

In accordance with one aspect of the present invention, An interface method for providing a message management of a portable terminal includes: receiving at least two different types of messages related to at least two first applications in order of message receipt time; integrating the at least two different types of messages corresponding to the at least two first applications through a second application integrally managing the at least two first applications; and displaying the at least two different types of messages related to the at least two first applications together with identification information of respective message types using the second application in a single screen.

In accordance with one aspect of the present invention, an electronic device having a screen includes: a display; a memory for storing at least two different types of messages related to at least two first applications in order of message receipt time; and a controller for integrating the at least two different types of messages corresponding to the at least two first applications through a second application integrally managing the at least two first applications and for controlling the display to display the at least two different types of messages related to the at least two first applications together with identification information of respective message types using the second application in a single screen.

According to the embodiments of the present invention, since the two or more types of messages received through a plurality of applications are integrally managed through one interface, users can more simply and intuitively use the messages provided through an e-mail service, an SMS service, and various SNS services.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Hereinafter, various embodiments of the present invention will be described with reference to the accompanying drawings.

In the embodiment, a function of receiving and sending a message is applied to portable terminals along with a communication function to provide voice calls and data transmission/reception through a 2G or 3G network, an internet connection through a Wireless Fidelity (Wi-Fi) network, and wireless communication through Bluetooth or Near Field Communication (NFC).

Moreover, the message may be provided through an e-mail, an SMS, an MMS, or a Social Network Service (SNS).

Each of the portable terminals performing such a function as described above includes a communication module (for example, a wireless communication unit) for performing a communication function, a storage unit for storing various data including messages, a display unit (for example, a screen unit) for displaying various pieces of information, a key input unit for inputting a character string or a command to the portable terminals, and a controller for controlling the above-described elements.

In particular, in many cases, a touch panel is implemented included in the display unit so that the key input unit is realized in a form of a touch screen.

Figure 1:
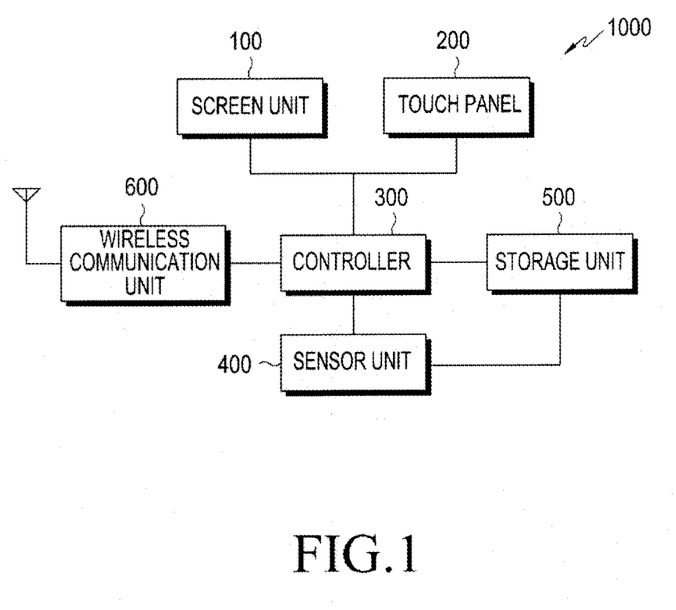
FIG. 1 is a block diagram showing a terminal according to an embodiment of the present invention.

FIG. 1 is a block diagram showing a terminal according to an embodiment of the present invention.

Referring to FIG. 1, the terminal 1000 according to the embodiment of the present invention may include a screen unit 100, a touch panel 200, a controller 300, a sensor unit 400, a storage unit 500, and a wireless communication unit 600.

The screen unit 100 displays images, and may include any one of a Plasma Display Panel (PDP), an Organic Light Emitting Diode (OLED), and a Cathode Ray Tube (CRT).

The touch panel 200 may be disposed on the screen unit 100, and in operation, a user touches various menu screens displayed on the screen unit 100 through the touch panel 200 so that a specific command may be performed. The touch panel 200 may be realized through any one of a resistive film manner, an electrostatic capacity manner, an ultrasonic wave manner, an infrared-ray manner, an optical manner, and a bending wave manner. The touch panel 200 is disposed on a front surface of the terminal 1000, and the screen unit 100 is disposed below the touch panel 200. A user interface which has been displayed by the screen unit 100 is shown to the user through the touch panel 200.

The controller 300 controls the overall operations of the terminal 100 as a central processing device, and serves to perform an interface method in the terminal 1000 according to the embodiment of the present invention.

The sensor unit 400 corresponds to a sensor detecting a location, a point of a compass, and a motion of the terminal 1000, and includes at least one of an acceleration sensor, a gravity sensor, an impact sensor, a GPS, and a compass sensor.

The storage unit 500 stores messages, an operating system of the terminal 1000, various applications, information input to the terminal 1000, and information generated in an interior of the terminal 1000.

The wireless communication unit 600 wirelessly transmits data transferred from the controller 300, and receives a radio signal from the atmosphere.

A more detailed structure of the terminal may be easily carried out by those skilled in the art to which the present invention pertains, whereby descriptions of the structure of the terminal will be omitted for simplicity.

In more detail, the present invention relates to an interface method for providing a message management of the portable terminal in which two or more messages types are received and sent through two or more different applications, respectively. In the exemplary embodiment, the two or more different applications may correspond to, for example, one or more combinations of applications for an e-mail, an SMS (short message service), an MMS (multimedia messaging service), and an SNS (short message service) (i.e., TWITTER®, FACEBOOK, or Me2day ®), however, the teachings of the present invention is not limited thereto.

Hereinafter, the two or more of application types are referred to as first applications. Moreover, the present invention has a feature of managing the two or more messages application types listed above using another application, which integrally manages the two or more of the first applications types. Hence, in the disclosure, the other application integrally managing the first applications is referred to as a second application.

Figure 2:
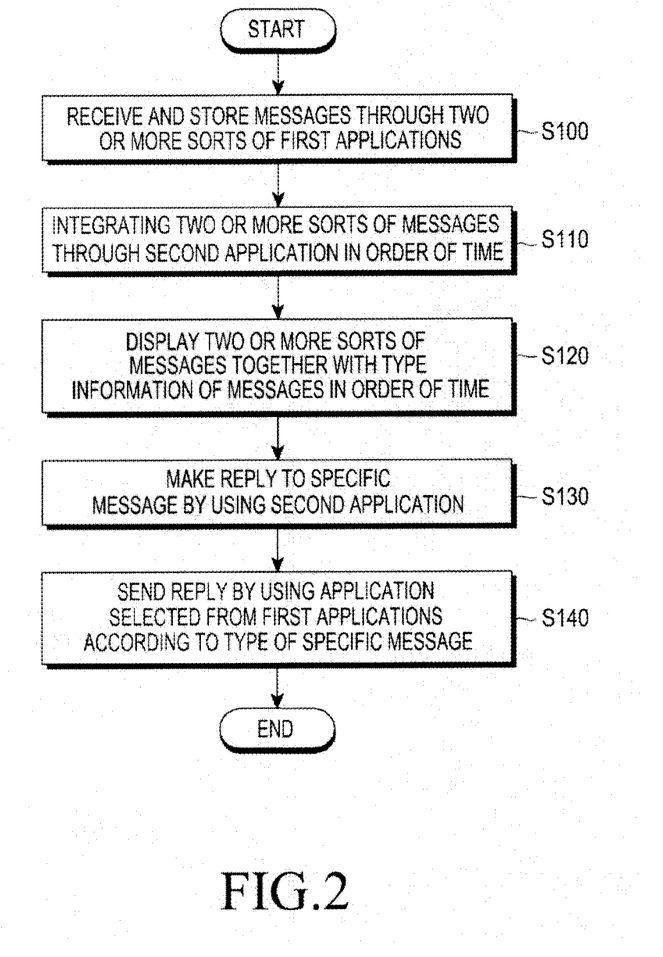
FIG. 2 is a flowchart showing an interface method for message management of a portable terminal according to an embodiment of the present invention.

FIG. 2 is a flowchart showing an interface method for providing a message management of a portable terminal according to an embodiment of the present invention.

Referring to FIG. 2, in the present invention, a first step (S100) corresponds to a step in which messages are received and stored in an order of time through two or more types of first applications. At this time, for example, when an SMS message is received, the SMS message may be stored in an allotted area of the storage unit 500 through an SMS application, or the controller 300 may store the SMS message in an area allotted to the SMS application within the storage unit 500 without driving the SMS application. When the first applications are executed, the received messages are displayed on a screen in an order of reception time or according to each sender. Although methods of displaying the received messages may be different from each other according to the applications, when the received messages are integrally managed through a second application as described below, displays of the received messages may be unified in a single screen.

A second step (S110) corresponds to a step in which the messages stored through the two or more types of first applications are integrated through a second application, which integrally manages the two or more types of first applications. That is, in order to manage the two or more types of messages, the present invention proposes a second application which may integrally manage the two or more of the first application types. To this end, the second application may be continuously executed in the portable terminal in a background or in a multitasking mode. That is, when a specific message is received through an arbitrary first application during execution of the second application, information on the specific message received through the first application is stored through the second application. Here, the function of indicating message reception in real time is called a push function.

At this time, a storage method may correspond to a method of copying the specific message itself, or a method of storing a location where the specific message is stored (specific location information on the message stored in the storage unit of the portable terminal). Moreover, the second application may be manually driven by a user, and it may search for and arrange the messages stored through the first applications at an initial process after being driven. To this end, in the second application, it is necessary to designate first applications, which a user desires to integrally manage, in advance. At this time, the number of the first applications may be one or more. Further, the second application may also designate all of the message related applications which have been installed in the portable terminal by default settings/options.

In addition, when there are applications which the user does not desire to integrally mange among the plurality of first applications which have been stored in the second application in advance, the user may selectively remove the applications which the user does not desire to integrally manage in a list existing in the second application, or may release the integrated management mode.

When the second application is driven, a screen of managing the list of the first applications is preferably configured such that it is identified whether or not the first applications are integrally managed.

A third step (S120) corresponds to a step in which the messages are displayed together with type information on the messages through the second application.

That is, when the second application is executed, one or more messages received through one or more first applications which have been registered in advance are displayed through an interface of the second application in single screen. As a result, the user can integrally view the two or more types of messages through a single screen, whereby it is possible to solve the prior art problem of driving separate applications for each message.

At this time, the messages are preferably displayed through the second application in an order of time, or are preferably differentiated according to types of first applications to be displayed through the second application. Further, the messages from different senders may be displayed in an order of reception time when the messages have been received, if necessary.

Moreover, when the messages are displayed through the second application, identification information on the messages is displayed together with the messages to provide the status or state of messages. For example, the identification information may be displayed in a form of identifier such as an icon, a figure, a color, or a text according to message types. As such, even if the two or more types of plural messages are displayed, the user can intuitively see which types of messages are received from respective parties.

As described above, the respective first applications may correspond to one or more combinations of applications for an e-mail, an SMS, an MMS, and an SNS. When the first application corresponds to an application for the SNS among them, the first application may be one of applications, whose service providers are different from each other, such as TWITTER®, FACEBOOK, Me2day®, but is not limited thereto.

Thus, according to the present invention, it is possible to conveniently and intuitively manage various types of messages received through the plurality of applications which the user of the portable terminal utilizes.

In addition, the present invention additionally provides a method of effectively making a reply to the messages which have been received as described above. To this end, the present invention may further include a fourth step (S130) and a fifth step (S240) as follows.

The fourth step (S130) corresponds to a step in which replies in response to the messages are made through the second application. Although, in principle, a reply to the received specific message is generally made in a particular first application corresponding to the received specific message, the reply may be generated and transmitted using g the second application, which integrally manages the specific application.

The second application preferably includes an interface which includes, for example, a receiver information input unit, a sender information input unit, a content input unit, and an attached file input unit.

The fifth step (S140) corresponds to a step in which the reply made through the second application in the fourth step (S130) is transmitted through any one selected from the first applications. At this time, the application for transmitting the reply may be automatically or manually selected. When the application is automatically selected, the application corresponding to an original message which is subject to the reply may be automatically selected. Alternatively, the second application may also convert the completed reply into a format of the corresponding application, and transmit the converted reply to a counterpart without the first application.

Moreover, when an application is automatically selected, for example, an input form of the receiver information input unit may be used. That is, when an e-mail address (for example, abc@abc.com) is input in the receiver information input unit, the controller of the portable terminal may automatically execute an e-mail application as an application to transmit the reply message, and when a phone number is input in the receiver information input unit, the controller may automatically execute an SMS application as an application to transmit the reply message.

That is, when a reply to a specific message or a new message is made through the second application, sender information, receiver information, content information, and information on an attached file are analyzed, and then the reply or the new message may be transmitted through a specific application selected from the first applications.

Alternatively, a reply to a specific message identified using the second application in the fourth step (S130) may be generated by a particular first application corresponding to the received specific message. The particular first application may be configured to be automatically executed. In this case, the second application simply has only to include a switching function such that the particular first application may be driven.

Accordingly, the user can effectively manage various types of messages, which have been received thorough the two or more types of plural applications, in a single screen.

Hereinafter, the present invention will be described in more detail through specific embodiments.

Figure 3:
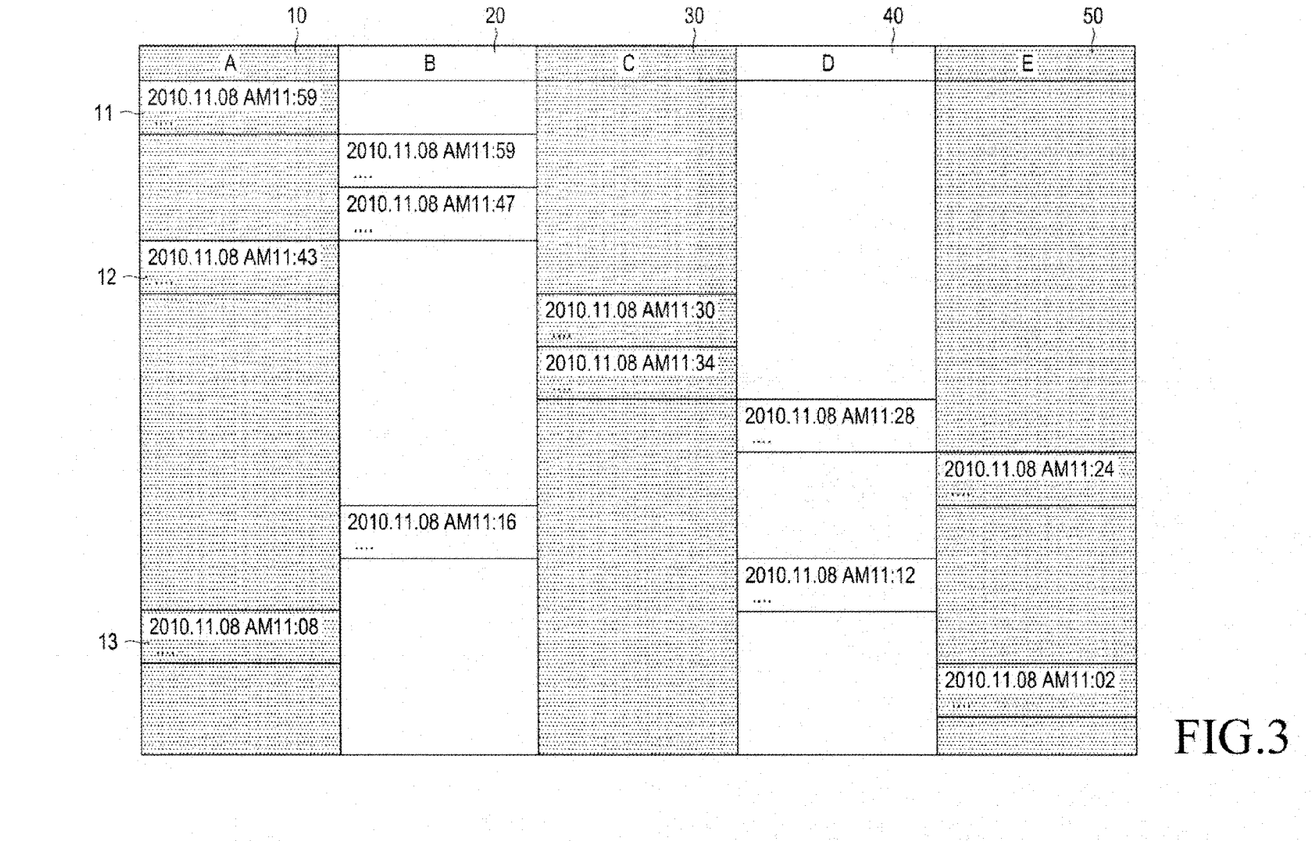
FIG. 3 shows an example of a screen where five types of messages are displayed thorough one interface in an order of time, according to an embodiment of the present invention.
Figure 4:
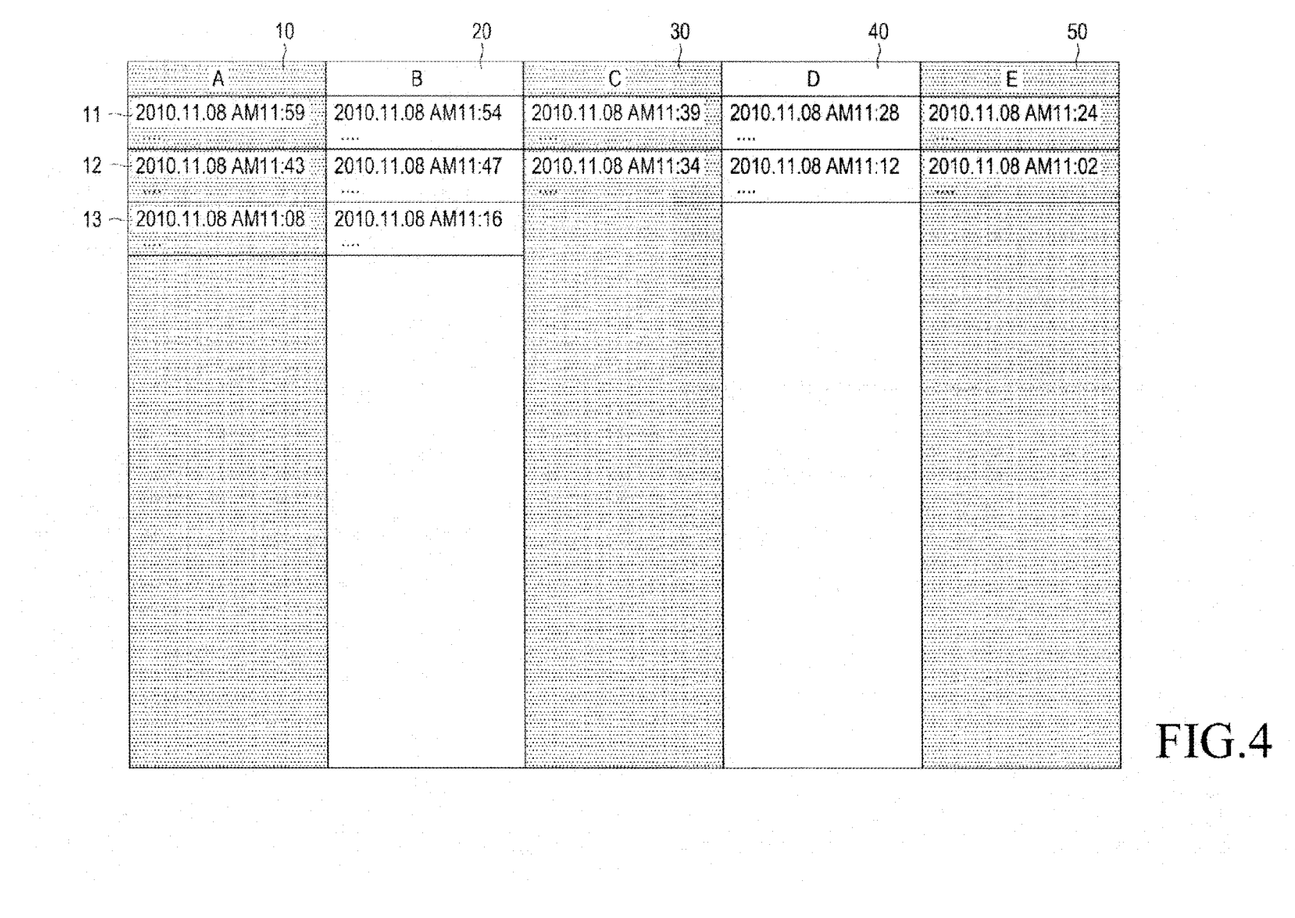
FIG. 4 shows an example of a screen where the five types of messages shown in FIG. 3 are displayed according to messages in an order of time.
Figure 5:
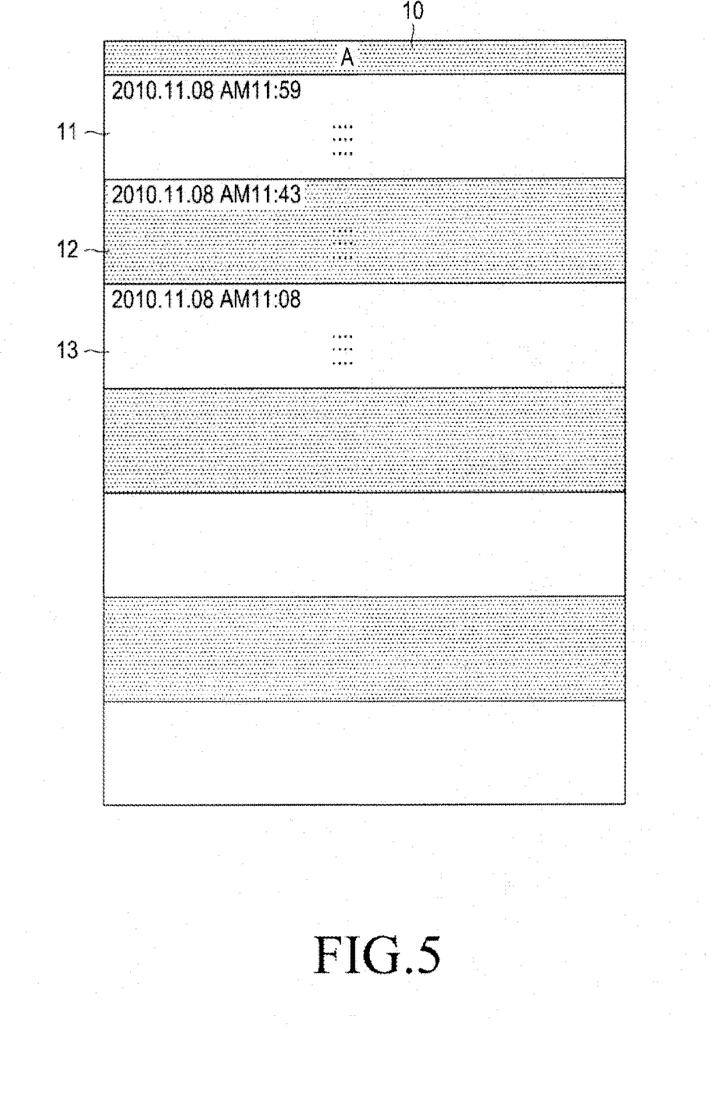
FIG. 5 shows an example of a screen where a specific sort of message among the five types of messages shown in FIG. 3 are displayed in an order of time.

FIGS. 3 to 5 show an interface of a second application displayed in a display unit 100 of a portable terminal 1000 in which an embodiment of the present invention is realized.

Referring to FIG. 3, an interface of a second application according to an embodiment of the present invention includes index units A, B, C, D, and E (10, 20, 30, 40, and 50) showing five types of first application items, respectively. For example, names of applications or services such as e-mail, TWITTER®, FACEBOOK, or Me2day® may be displayed in the index units A, B, C, D, and E (10, 20, 30, 40, and 50), respectively. Instead of the names as described above, icons for displaying the applications or the services may also be selectively displayed. When a user touches one of the index units A, B, C, D, and E 10, 20, 30, 40, and 50, the selected first application may be executed and displayed, along with the second application, in the display unit 100.

Moreover, messages 11, 12, and 13, which have been received for the applications or services, may be displayed at lower ends of the index units A, B, C, D, and E 10, 20, 30, 40, and 50 in order of time.

In the screen shown in FIG. 3, since all the messages received through the five types of first applications are arranged to be apprehended in an order of time, only one message is displayed in each row.

However, although, from a point of view of a user, such a display method described above helps the user intuitively identify various types of messages in an order of reception time, since a relatively few number of messages are displayed on the screen, the display method may be inefficient.

Referring to FIG. 4, five types of messages are arranged according to index units A, B, C, D, and E 10, 20, 30, 40, and 50 in an order of reception time, respectively. For example, a user may convert a screen shown in FIG. 3 into a screen shown in FIG. 4 through a specific touch input. Such an operation as described above may also be realized through an operation where two fingers touch on the screen while a gap between them being widened, and then are pinched toward each other (an operation of spreading and pinching two fingers). On the other hand, the screen shown in FIG. 4 may also be converted into the screen shown in FIG. 3 through an operation where two fingers touch on the screen while a gap between them being narrowed, and then are moved away from each other (an operation of pinching and spreading two fingers).

Moreover, the user may also view message items, which have been received through a specific sort of application, in order of time.

Referring to FIG. 5, one application, for example, one e-mail is displayed in an index unit A 10, and messages 11, 12, and 13 received in the e-mail item are displayed at a lower end of the index unit A 10 in an order of time. A screen may be relatively widely utilized as compared with the embodiments shown in FIGS. 3 and 4, which enables more information to be displayed on the screen.

For example, such a screen conversion as described above may be performed through touching the specific index units A, B, C, D, and E 10, 20, 30, 40, and 50 in the screens shown in FIGS. 3 and 4. A user simply touches on the specific index unit 10 to identify only information on the corresponding item in more detail.

Alternatively, such a screen conversion as described above may be realized by a sliding screen conversion effect where, in a state where the index unit A 10 and the associated messages 11, 12 and 13 are displayed as shown in FIG. 5, when a user presses and pushes leftward (or rightward) a touch panel 200 shown in FIG. 1, the index unit A 10 and the associated messages 11, 12 and 13 slide leftward (or rightward) to gradually disappear, and an index unit B 20 and associated messages slide leftward (or rightward) to gradually appear.

Figure 6:
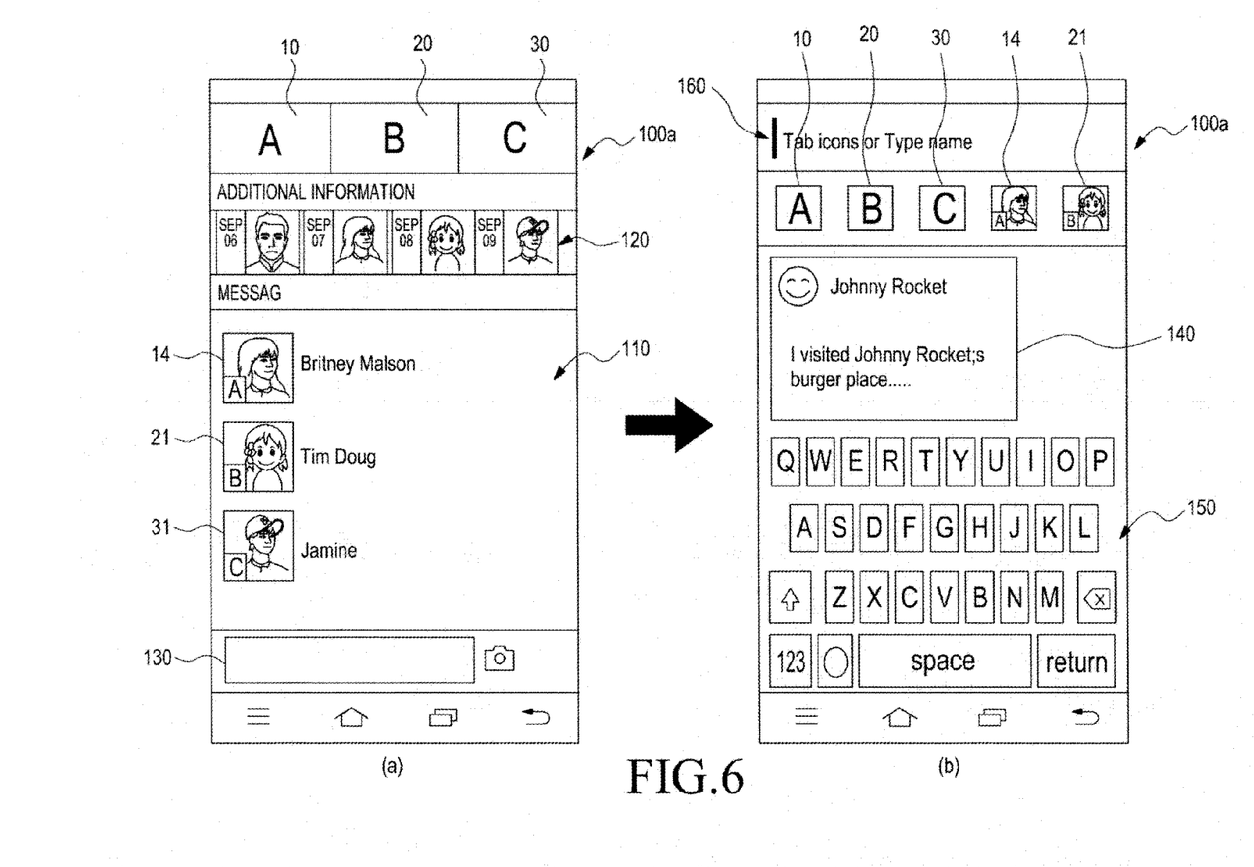
FIG. 6 shows an example of an interface of a second application displayed in a display unit of a portable terminal in which another embodiment of the present invention is realized.

FIG. 6 shows an example of an interface of a second application displayed in a display unit 100 of a portable terminal 1000 in which another embodiment of the present invention is realized. FIG. 6A shows an interface 100a of the second application in a message reception mode, and FIG. 6B shows an interface 100a of the second application in a message writing mode.

Referring to FIG. 6A, the interface 100a of the second application in the message reception mode includes index units A, B, and C 10, 20, and 30 showing three types of first application items, respectively.

For example, names of applications or services such as e-mail, SMS, TWITTER®, FACEBOOK®, or Me2day® may be displayed in the index units A, B, and C 10, 20, and 30 respectively. When a user touches one of the index units A, B, and C 10, 20, and 30, the selected first application may be executed and displayed, along with the second application, in the display unit 100.

Additional information (a birth day, a meeting date) 120 related to other users registered as a friend in the first applications may be displayed below the index units A, B, and C 10, 20, and 30.

Messages 14, 21, and 31 received for the applications or the services are displayed below the additional information 120 in an order of time. The first message 14 corresponds to a message received through a first sort of first application corresponding to the index unit A 10, the second message 21 corresponds to a message received through a second sort of first application corresponding to the index unit B 20, and the third message 31 corresponds to a message received through a third sort of first application corresponding to the index unit C 30.

A message writing unit 130 is displayed below the messages 14, 21, and 31. For example, when a user selects one of the messages 14, 21, and 31, and then selects the message writing unit 130, a message reception mode may be converted into a message writing mode. Alternatively, a user may also directly make a message in the message writing unit 130 without a conversion into a message writing mode. Other menus such as a photo addition menu and a file addition menu may be further provided next to the message writing unit 130.

Referring to FIG. 6B, index units A, B, and C 10, 20, and 30 showing three types of first application items, and icons 14 and 21 showing the received messages are displayed in the interface 100a of the second application in the message writing mode. When a user touches one of the index units A, B, and C 10, 20, and 30, the selected first application may be executed and displayed, along with the second application, in the display unit 100. Moreover, when a user touches one of the icons 14 and 21, a sender of the selected received message is set as a receiver of a reply message.

A receiver information input unit 160 is displayed above the index units A, B, and C 10, 20, and 30. A user directly inputs a name or an address of the user in the receiver information input unit 160, or selects one of the icons 14 and 21 such that a sender of the selected received message is automatically input to the receiver information input unit 160. Moreover, when a user has already selected the received message to which a reply will be made in a message reception mode, a sender of the received message may be automatically input to the receiver information input unit 160.

A content input unit 140 is displayed below the index units A, B, and C 10, 20, and 30. Contents of a message which a user has made are displayed in the content input unit 140. Other menus such as a photo addition menu and a file addition menu may be provided next to the content input unit 140.

A character input interface 150 is displayed below the content input unit 140. An English alphabet input interface is shown in FIG. 6B, and a user may convert the English alphabet input interface into another language input interface through an operation where the user presses a specific button, or presses and pushes a touch panel 200 shown in FIG. 1. For example, the conversion of the character input interface 150 may be realized by a cube screen conversion effect where a virtual cube on which the corresponding input interfaces are displayed on the respective surfaces is rotated, or by a sliding screen conversion effect where two types of character input interfaces slide leftward (or rightward) or upward (or downward), and are changed.

As described above, according to the present invention, a user can receive two or more types of messages, and can make and send messages regardless of types or types of messages by using an application capable of integrating various types of messages in the portable terminal In the above described embodiments, although the terms such the first applications and the second application have been used, the second application may also be referred to as an integrated message application, and the first applications may also be referred to as first, second, . . . , and nth message applications.

It can be seen that the embodiments of the present invention are realized in a form of hardware, software, or a combination of hardware and software. The arbitrary software can be stored in, for example, irrespective of being erasable or rewritable, a volatile storage device, a non-volatile storage device such as a ROM, a memory such as a RAM, a memory chip device, and an integrated circuit, an optically or magnetically recordable and machine (for example, a computer) readable storage medium such as a CD, a DVD, a magnetic disk, and a magnetic tape. It can be seen that the storage unit corresponds to an example of the storage medium which is suitable for storing a program or programs including instructions by which the embodiments of the present invention are realized, and is machine readable. Accordingly, the present invention includes a program which includes a code for realizing a method described in arbitrary claims of the present specification, and a storage medium which stores such a program as described above and is machine readable. Moreover, such a program as described above can be electronically transferred through an arbitrary medium such as a communication signal transferred through cable or wireless connection, and the present invention properly includes the things equivalent to that.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. An interface method for providing a message management of a portable terminal, the method comprising:
   receiving at least two different types of messages related to at least two communication services
   integrating the at least two different types of messages related to the at least two communication services; and
   displaying the at least two different types of messages related to the at least two communication services together with identification information of respective message types in a first region on a display; and
   displaying a plurality of additional information in a second region on the display adjacent to the first region, each additional information associated with one contact registered in the portable terminal.

2. The interface method of claim 1, wherein the at least two different types of messages related to the at least two communication services are continuously displayed according to an order of message receipt time.

3. The interface method of claim 2, wherein the at least two communication services comprise at least two or more of communication services relating to an e-mail, a short message service (SMS), a multimedia message service (MMS), and a social network service (SNS).

4. The interface method of claim 1, wherein the at least two different types of messages are differentiated and displayed according to application types.

5. The interface method of claim 1, wherein the at least two different types of messages are distinctively displayed from each other using text identifiers corresponding to the respective message types.

6. The interface method of claim 1, further comprising:
   generating a reply message in response to a selection of one of the at least two different types of messages; and
   transmitting the generated reply message.

7. A non-transitory machine readable storage medium storing one or more programs comprising instructions which, when executed by a portable terminal, cause the portable terminal to execute the method according to claim 1.

8. A portable terminal comprising the non-transitory machine readable storage medium of claim 7.

9. An electronic device, comprising:
   a display;
   a memory for storing at least two different types of messages related to at least two communication services; and
   at least one processor coupled to the memory, configured to:
   integrate the at least two different types of messages related to the at least two communication services in order of message receipt time,
   control the display to display the at least two different types of messages related to the at least two communication services together with identification information of respective message types in a first region of the display, and
   control the display to display a plurality of additional information in a second region on the display adjacent to the first region, each additional information associated with one contact registered in the electronic device.

10. The electronic device of claim 9, wherein the at least one processor controls the display to continuously display the at least two different types of messages related to the at least two communication services in the order of message receipt time.

11. The electronic device of claim 9, wherein the at least two different types of messages are differentiated and displayed according to application types.

12. The electronic device of claim 9, wherein the at least two different types of messages are distinctively displayed from each other using text identifiers corresponding to the respective message types.

13. The electronic device of claim 9, wherein the at least two communication services comprise at least two or more of communication services relating to an e-mail, a short message service (SMS), a multimedia message service (MMS), and a social network service (SNS).

14. The electronic device of claim 9, wherein the at least one processor further controls the display to generate a reply message in response to a selection of one of the at least two different types of messages, and transmit the generated reply message.

* * * * *